Figure 5:
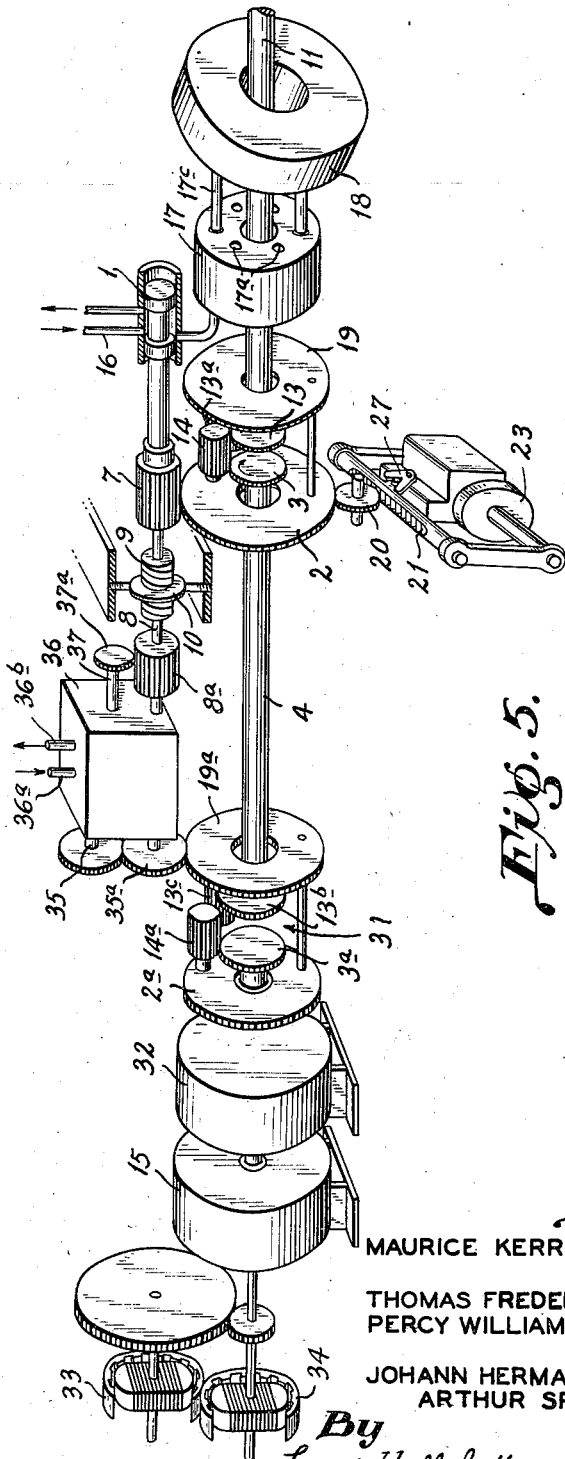

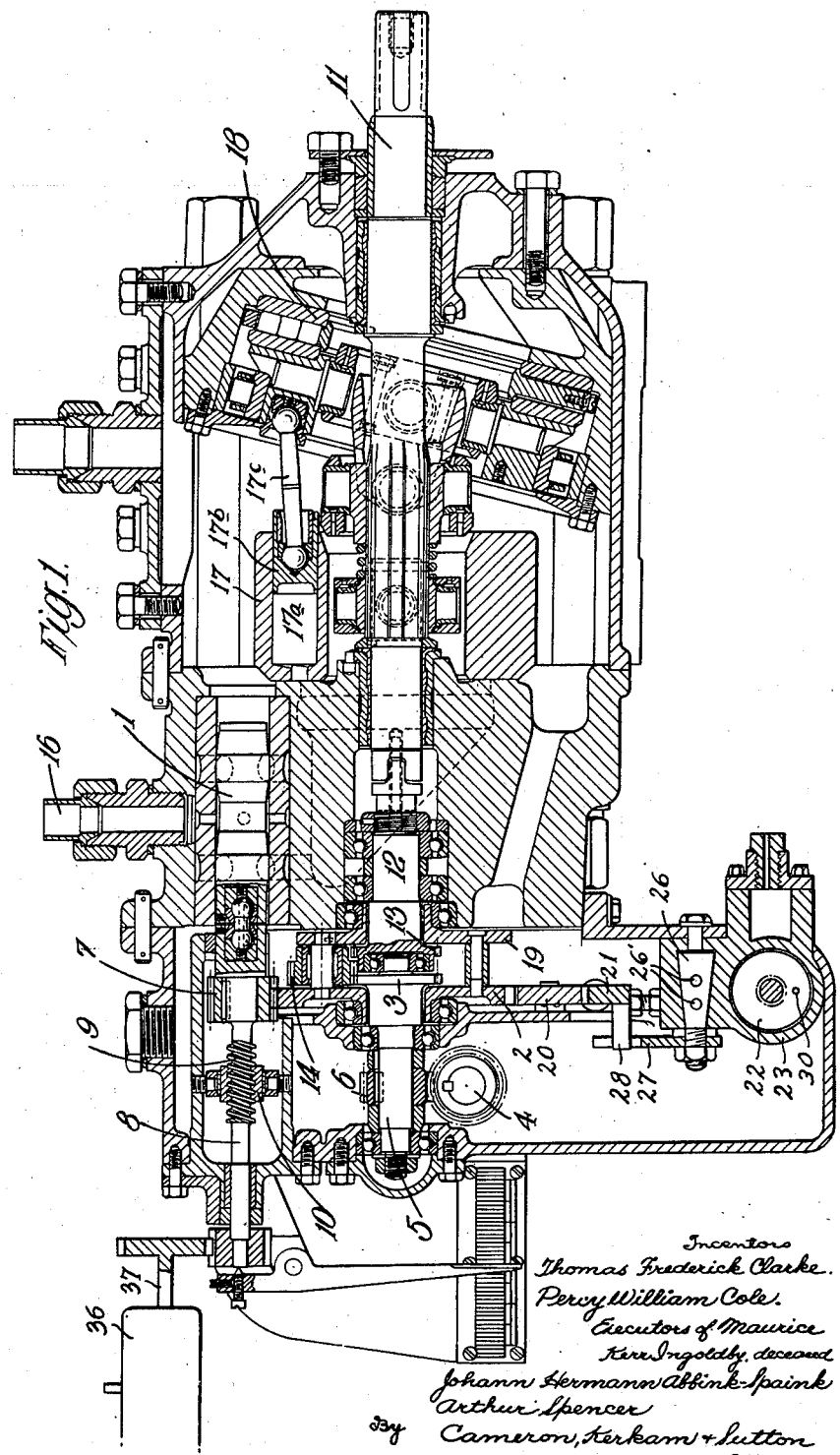

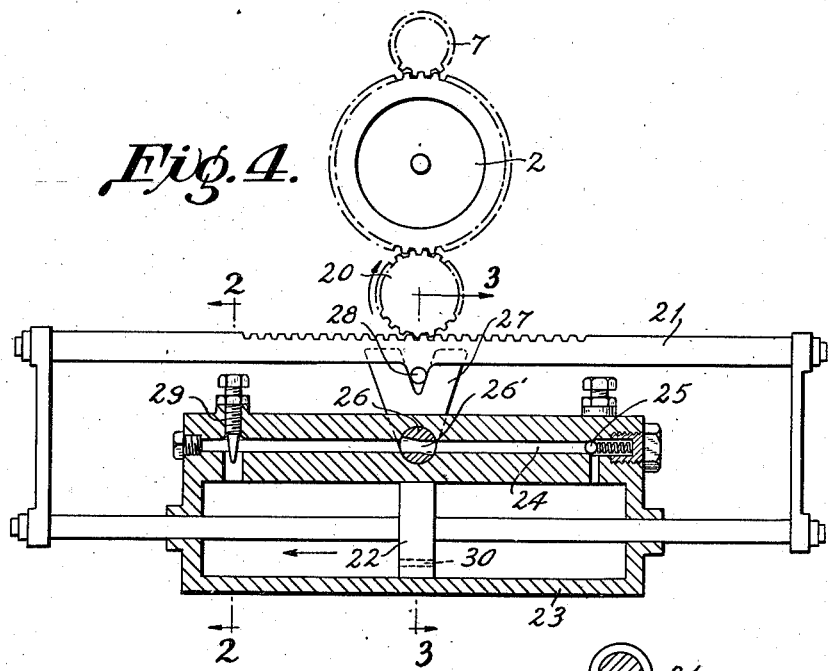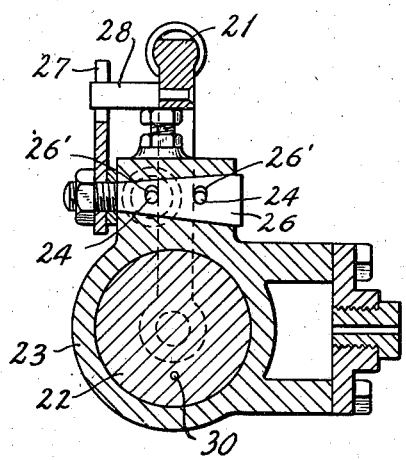

Inventors:
MAURICE KERR INGOLDBY,
                    DECEASED.
THOMAS FREDERICK CLARKE, AND
PERCY WILLIAM COLE,
                    EXECUTORS.
JOHANN HERMANN ABBINK-SPAINK
    ARTHUR SPENCER.
By
Loyd Hall Sutton Attorney Patented Sept. 30, 1947

2,428,025

UNITED STATES PATENT OFFICE 2,428,025

TRANSMISSION SYSTEM FOR THE REMOTE CONTROL OF GUN MOUNTINGS AND OTHER BODIES HAVING LIKE MOVEMENTS

Maurice Kerr Ingoldby, deceased, late of Tynemouth, England, by Thomas Frederick Clarke, Swanley, England, and Percy William Cole, Purley, England, executors, and Johann Hermann Abbink-Spaink, Jesmond, Newcastle-on-Tyne 2, and Arthur Spencer, Benwell, Newcastle-on-Tyne 5, England, assignors to Vickers-Armstrongs Limited, London, England, a British company Application March 19, 1942, Serial No. 435,348
In Great Britain June 9, 1939

6 Claims. (Cl. 121—41)

This invention relates to power transmission systems and is more particularly concerned with systems for transmitting movements to gun mountings.

It has been appreciated that serious difficulties arise in training and elevating heavy gun mountings due to the massive resistance offered to both acceleration and deceleration. It will be clear that any transmission system has limits as to the torque which it is capable of exerting and in relation to a given massive load there will be limits as to acceleration and deceleration, within which the massive load may remain in coincidence with the director during movement of the latter. It is, therefore, necessary to include within the transmission system, as between the director and the load, a form of wrap-up which will serve to limit the operation of the transmission, so as to allow such operation to take place only within the natural limitations of the particular system concerned. In the case of, for example, naval fire-control where several guns may be controlled through the same channels of transmission, it will be appreciated that each mounting may have characteristic limitations which are not necessarily identical with the others. A problem therefore arises in the provision of satisfactory wrap-up mechanism which will permit each mounting controlled, to be operated within its own natural limitations so as to preserve alignment with the director if it is possible to do so within such limitations or, alternatively, to regain alignment at the earliest possible moment, should such limitations otherwise be exceeded.

In the ensuing description which describes the apparatus forming the subject of the invention as applied to the operation of a gun mounting, the mounting operates with the aid of hydraulic power amplifier apparatus, the sensitive control element of which is driven by an electric motor which may be the follow-up motor in an electric follow-up system, means being arranged in association with the hunter control element of the hydraulic follow-up power amplifier, for limiting the rate of displacement thereof in either direction. By virtue of the fact that the rate of displacement of the hunter control determines the acceleration or deceleration of the output from the hydraulic amplifier, a control is obtained of the acceleration and deceleration of the massive load operated by the hydraulic amplifier. The effect will be to slow down, or tend to accelerate, the follow-up motor operating with the hydraulic power amplifier, but, by virtue of the nature of the latter, i. e. the fact that it is a follow-up motor, the transmission system which precedes the follow-up motor will tend to restore the motor always to its correct position of alignment as soon as this may be attained.

The term "wrap-up" referred to herein is intended to cover the transient condition wherein the controlled part is not capable of following the controlling portion of the apparatus in unison, thereby indicating a cumulative effort which eventually brings about the desired effect.

The term "hunter-control" is intended to cover a condition wherein the mis-alignment between the initiating mechanism and the follower causes the follower to be moved in the direction of the initiating mechanism, thereby tending to restore alignment.

Referring to the drawings:

Figure 1 is a sectional view of a hydraulic power amplifier unit incorporating the invention;

Figures 2 and 3 are respectively sectional and elevation views on the lines 2—2 and 3—3 of Figure 4 which is a sectional side elevation view of a dashpot for preventing too rapid acceleration and deceleration of the high torque output shaft of the hydraulic amplifier relatively to the low torque input shaft; and Figure 5 is a perspective view illustrating diagrammatically the unit and its associated driving mechanism.

The hydraulic power amplifier unit illustrated in section in Figure 1 has a control valve 1 operated by the side member 2 of a differential gear as a result of rotational movement of the input shaft, one sun member 3 of the differential gear being in driven connection with the sensitive low torque input shaft 4 by way of a shaft 5 connected with the input shaft through the medium of gearing 6. The output shaft is indicated by the reference numeral 11, and it is to be assumed that it is connected to the mass to be moved, e. g., the gun, through the medium of a gear, which according to known practice can include an irreversible worm to prevent the gun from driving back on the output shaft 11. The side member 2 meshes with and drives a pinion 7, the latter being secured to a shaft 8 coupled with the valve and located in suitable bearings and having a worm thread 9 in threaded engagement with a correspondingly threaded stationary member 10, rotational movement of the shaft 8 thus causing the valve not only to be turned about its axis but to be moved longitudinally to effect the opening and closing movement, thus controlling the inflow of oil to the unit, the pinion 7 being of a sufficient width to permit of such longitudinal movement without disengagement of the teeth of the members 7 and 2.

When the input shaft 4 is turned initially, the side member 2 of the differential gear will be displaced by reason of the load imposed on the output shaft 11, a continuation 12 of which is solid in relation to a sun gear member 13 with which meshes a planet wheel 13a (Figure 5) carried by a side member 19 fixed in relation to the side member 2. The planet wheel 13a meshes with the planet wheel 14 carried by the side member 2 and meshing with gear wheel 3 fixed to the input shaft 4 which passes idly through the side member 2. The said displacement of the side member 2 will cause a corresponding longitudinal displacement of the valve 1, to permit of the inflow of the operating fluid, which displacement will continue until the high torque output shaft 11 gains the speed of the input shaft 4, when the valve will remain in that position. In this way, the output shaft is capable of driving back to the input shaft, therefore over-riding the driving motor. The side member 2 of the differential gear, which may therefore be identified with the control of the hunter, has a displacement proportional to the speed of the output shaft and also proportional to the lag in the hydraulic amplifier.

The input shaft 4 is controlled as regards its amount or angle of rotation by remote control means not shown but which, as shown diagrammatically in Figure 5, embodies coarse and fine Selsyn resetter units 33 and 34 respectively. These Selsyn units are connected to like initiating units at the remote control end but this connection forms no part of the present invention, the chief consideration herein being that the fine Selsyn unit 34 controls an electric motor 15 which, through the medium of a differential gear (indicated generally by the reference numeral 31), drives the input shaft 4, and has combined therewith checking or damping means. The purpose of the supplementary differential gear is to correct for lag as hereinafter explained.

In order to ensure a smooth transmission of power from the motor 15 to the input shaft 4 irrespective of the variations in torque required to move the shaft 4, an artificial load in the form of an electric generator 32 is coupled to the motor 15, the field winding of the generator being permanently energized and the armature virtually short circuited, the power absorbed by the generator being many times greater than the variations in torque which may arise in the shaft 4.

The differential gear 31 is identical with the already described differential gear of the hydraulic motor and embodying the input shaft sun gear 3, output shaft sun gear 13, side members 2 and 19 and planet members 13a and 14, and in this differential gear 31 the input and output sun gear members are indicated by the reference numerals 3a and 13b respectively, the side members by the reference numerals 2a and 19a, and the planet members by the reference numerals 13c and 14a.

The hydraulic power amplifier or motor embodies the known arrangement of parallel axis cylinders 17a in a block 17, the valve 1 establishing and cutting off the flow of pressure fluid from inlet connection 16 to the valve-controlled ports of these cylinders, and the cylinders accommodating pistons 17b connected by rods 17c to an angle box 18, with the result that the cylinder block 17 is caused to rotate when the pistons are displaced by fluid pressure, the cylinder block carrying the output shaft 11 around with it.

The step-by-step operation of the mechanism is as follows: Assuming the input shaft 4 to be turned clockwise as indicated in Figure 5, the sun member 3 attached thereto will rotate the pinion 14 which, with the cooperating planet wheel 13a, will have a translative movement imparted to it about the other sun member 13, thereby causing the side member 2 to rotate in, say, a clockwise direction, pinion 7 thereby causing the hydraulic control valve 1 to be given a combined rotary and longitudinal movement, admitting fluid to the cylinders 17 and causing the angle box 18 to rotate the main output shaft 11 in an anti-clockwise direction.

As aforesaid, the shaft 11 is in driving connection with the sun gear 13 so that if the input shaft 4 is stopped or decelerated, planet pinions 13a and 14 cause the crown wheel or side member 2 to rotate in an anti-clockwise direction, thereby restoring the sliding valve 1 to its original position and bringing the apparatus to rest.

It will thus be seen that when the input shaft 4 is rotated through 10° and then brought to rest, the output shaft 11 is correspondingly turned through 10° and comes to rest.

It will also be appreciated that the relative angular displacement between the shaft 4 and the shaft 11 determines the amount of opening of the valve 1 and therefore that for a given output torque, an increase in the speed of shaft 11 is due to an increase of the lag or angular displacement between shafts 4 and 11.

The member 2 of the differential gear is connected through the medium of the pinion 20 with a longitudinally displaceable rack 21, longitudinal movement of the rack being controlled by a dashpot retarding device consisting of a piston 22 located in a cylinder 23. The opposite ends of the cylinder are connected by two parallel channels 24 each of which contains a spring-loaded non-return valve 25, so arranged that fluid can only enter the cylinder, the valves being arranged at opposite ends of the channels in ports leading to the cylinder. The channels 24 jointly contain a rotary valve 26 having two borings or ports 26' each communicating with one of channels 24. The valve 26 controls the flow of fluid through the channels and is adapted to be opened and closed as a result of longitudinal displacement of the rack 21, a rocking lever 27 secured to the valve being engaged by a projection 28 on the rack. At the end of each channel 24 opposite that at which the non-return valve 25 is located there is a port communicating with the cylinder and containing a needle valve 29 controlling the outflow of fluid from the cylinder. The channels 24 are thus identical except for the fact that the valves 25 and 29 are oppositely arranged. A small bore bleed hole 30 is formed in the piston which permits fluid to pass slowly through the piston.

In the position shown both of the ports 26' in the valve 26 are open, but on movement of the rocking lever 27 in either direction, one or the other of the ports is closed or opened according to the direction of movement enabling the dashpot to offer a greater resistance during return of the piston 22 to the mid position than during the outward motion in either direction.

For an understanding of the operation of the described apparatus, it will first be assumed that the input side of the differential gear is stationary and, therefore, the ports of the valve 1 are in a central zero position as shown. Then the piston 22 of the dashpot will also be occupying a centre position as shown and the port 26' in each channel 24 will be open. If now the input shaft 4 is operated by the motor 15 so as to off-set the centre member of the differential gear and thereby bring the power amplifier into operation, then simultaneously the piston 22 of the dashpot begins to travel away from its centre position with relatively little opposition to the motor drive.

Assuming that the piston is moved to the left, as shown by the arrow in Figure 4, the appropriate port 26' in the valve 26, due to its angular arrangement, will remain fully open during the first part of the movement of the piston in that direction. Fluid can thus pass from the left hand side of the piston through the channel 24 shown and past the non-return valve 25 shown to the right hand side of the piston. The other channel 24, which is to the rear in Figure 4, is completely closed by its non-return valve 25 and the rearward port 26' immediately commences to close and finally closes. As the piston continues its leftward movement the front port 26' also commences to close the front channel 24 and may close it completely as the piston reaches its extreme left hand position, although the hole 30 is always open. During return movement of the piston in the right hand direction towards its centre position, the fluid is prevented from returning through the front channel 24 shown owing to the non-return valve 25 engaging its seating. The port 26' in the rear channel is closed at first, but as the piston moves from its extreme left hand position towards the center, this port and the non-return valve open and permit the flow of liquid through the rear channel.

The bleed hole 30 in the piston is the only direct connection between the two ends of the cylinder and constitutes an escape hole through which the fluid can pass slowly from one end of the cylinder to the other, as for example when both ports 26' are closed as would occur near either extreme position of the piston.

An important feature of the present invention is the provision of means to control the opening and closing of the valve 1 during acceleration and deceleration. In this connection it will be evident that a rapid closing of the valve, e. g., upon stopping the motor 15, would soon result in breaking down of the transmission or control means due to the inertia of the heavy mass being controlled. Because of this, means comprising the dashpot 23 is provided which yieldingly opposes the driving from the output shaft 11 of the side gear member 2 upon deceleration or stopping of the motor 15, this yielding opposition being such that instead of the output shaft 11 driving directly back upon the side member 2, immediately upon stopping or deceleration of the motor, it first heels against and spins the motor 15, i. e., causes the motor 15 to over-run via the sun wheels 13 and 3, the planet wheels 13a and 14, shaft 4, sun wheel 13b, planet wheels 13c and 14a and sun wheel 3a. This "heeling" is due to the fact that the dashpot offers maximum resistance to displacement of its piston when the valve 1 is fully open, i. e., when the piston 22 is at one end of the cylinder, so that the displacement of the piston back to the central part of the cylinder is at first very slow due to the appropriate port 26' being closed and the very restricted flow of fluid through the bleed hole 30. That is to say, at this stage the side member 2 is almost stationary, it being understood that the capacity of the dashpot 23 is sufficient to retard to the desired extent the rotation of the shaft 11 under the influence of the reaction of the gun or equivalent controlled mass and the drive of the hydraulic power amplifier when the drive from the motor 15 has been stopped.

The resistance of the motor 15 to the over-running produced by the "heeling" action introduces translative movement of the planet members 13a and 14 proportional to the resistance, i. e., the resistance of the member 3a and consequently of the shaft 4 to rotation. Thus, the member 2 is caused to rotate and drive the dashpot piston 22 at a much slower speed than would occur if the motor 15 totally resisted over-running, the resistance to this drive of the piston progressively diminishing by reason of the gradual opening of the appropriate port 26', until ultimately the piston returns to its mid-stroke position and the valve 1 reaches the closed position.

The aforesaid differential 31 is primarily introduced to correct for lag, for which purpose the side member 19a is in constant mesh with a gear wheel 35a driven from the output shaft 35 of a small hydraulic power amplifier 36, which is a miniature of the main power amplifier already described. The input shaft 37 of this small auxiliary unit 36 is driven from the valve spindle 8 via gear members 8a and 37a, and the supply and return conduits for the unit 36 are indicated by the reference numerals 36a and 36b respectively. Thus, any rotation imparted to the side member 2 operates a valve in the unit 36 in a like manner to the operation of the main valve 1 and the side member 19a of the supplementary differential gear 31 has imparted to it a movement proportional to the movement of the side member 2 of the main differential gear; and provided there is still available a translative displacement of the valve 1, this drive of the side member 19a will introduce the extra movement to the side member 2 to complete the motion of the valve 1, whereupon the rotation of the input shaft 37 of the small unit 36 will be stopped with consequent coming to rest of the small unit.

What we claim and desire to secure by Letters Patent of the United States is:

1. A power transmission system particularly applicable to gun mountings comprising an hydraulic power amplifier unit having a sensitive low torque input shaft, a high torque output shaft and a valve controlling the flow of fluid to the amplifying mechanism, a differential gear connecting the low torque input shaft with said valve to effect its opening and closing movement and also connected with said high torque output shaft so as to restore the valve to neutral position when the motion of the input shaft ceases, and a damping device connected with said differential gear for retarding the rate of opening and closing movement of said valve and having a greater resistance to the closing of the valve than to the opening of the valve, to thereby control the acceleration and deceleration of said high torque output shaft in relation to the acceleration and deceleration of said low torque input shaft.

2. In a power transmission system, an electric motor, a low torque input shaft driven from said electric motor, a hydraulic power amplifier unit, a high torque output shaft driven by the power amplifier, a valve for controlling the supply of pressure fluid to the hydraulic power amplifier, a differential device connecting the input shaft to the output shaft and the two shafts to the valve so that the valve is opened and closed by reason of the reaction between said shafts, and a damping device connected with said differential device and yieldingly opposing movement of the valve so as to prevent sudden acceleration and deceleration of the high torque output shaft in relation to the acceleration and deceleration of the low torque input shaft, said damping device being so constructed and arranged as to restrain closing of the valve to an extent sufficient to cause the load due to said reaction to be transferred to said electric motor through the differential device so as to over-run the motor, whereby the resistance of the motor to such over-running reacts through the differential device against the damping device and gradually closes the valve.

3. In a power transmission system, an electric motor, a low torque input shaft driven from said electric motor, a hydraulic power amplifier unit, a high torque output shaft driven by the power amplifier, a valve for controlling the supply of pressure fluid to the hydraulic power amplifier, a differential gear connecting the input shaft to the output shaft and the two shafts to the valve so that the valve is opened and closed by reason of the reaction between said shafts, and a damping device yieldingly opposing movement of the valve and having a greater resistance to the closing than to the opening of the valve so that upon reduction of the power on the motor its speed is maintained mechanically by the output shaft of the hydraulic power amplifier spinning the motor and reacting via the differential gear against the damping device to close the valve gradually.

4. In a power transmission system, an electric motor, a low torque input shaft driven from said electric motor, a hydraulic power amplifier unit, a high torque output shaft driven by the power amplifier, a valve for controlling the supply of pressure fluid to the hydraulic power amplifier, a differential gear connecting the input shaft to the output shaft and the two shafts to the valve so that the valve is opened and closed by reason of the reaction between said shafts, and a damping device yieldingly opposing movement of the valve and having a greater resistance to the closing than to the opening of the valve so that upon reduction of the power on the motor its speed is maintained mechanically by the output shaft of the hydraulic power amplifier spinning the motor and reacting via the differential gear against the damping device to close the valve gradually, and an electrical braking device interposed between said motor and said input shaft.

5. In a power transmission system, an electric motor, a low torque input shaft driven from said electric motor, a hydraulic power amplifier unit, a high torque output shaft driven by the power amplifier, a valve for controlling the supply of pressure fluid to the hydraulic power amplifier, a differential gear connecting the input shaft to the output shaft and the two shafts to the valve so that the valve is opened and closed by reason of the reaction between said shafts, and a damping device yieldingly opposing movement of the valve and having a greater resistance to the closing than to the opening of the valve so that upon reduction of the power on the motor its speed is maintained mechanically by the output shaft of the hydraulic power amplifier spinning the motor and reacting via the differential gear against the damping device to close the valve gradually, and a further differential for the purpose of lag correction interposed between said motor and the input shaft.

6. In a power transmission system, an electric motor, a low torque input shaft driven from said electric motor, a hydraulic power amplifier unit, a high torque output shaft driven by the power amplifier, a valve for controlling the supply of pressure fluid to the hydraulic power amplifier, a differential gear connecting the input shaft to the output shaft and the two shafts to the valve so that the valve is opened and closed by reason of the reaction between said shafts, and a damping device yieldingly opposing movement of the valve and having a greater resistance to the closing than to the opening of the valve so that upon reduction of the power on the motor its speed is maintained mechanically by the output shaft of the hydraulic power amplifier spinning the motor and reacting via the differential gear against the damping device to close the valve gradually, an electrical braking device interposed between said motor and input shaft, and a further differential for the purpose of lag correction interposed between said braking device and the input shaft.

THOMAS FREDERICK CLARKE.
PERCY WILLIAM COLE.
Executors of the Estate of Maurice Kerr Ingoldby, Deceased.
JOHANN HERMANN ABBINK-SPAINK.
ARTHUR SPENCER.

REFERENCES CITED

The following references are of record in the file of this patent:

UNITED STATES PATENTS

| Number | Name | Date |
|---|---|---|
| 1,749,569 | Florez | Mar. 4, 1930 |
| 1,875,226 | Dewandre | Aug. 30, 1932 |
| 1,959,786 | Hodgkinson | May 22, 1934 |
| 2,020,847 | Mitereff | Nov. 12, 1935 |
| 2,041,952 | Poitras | May 26, 1936 |
| 2,049,375 | Henderson | July 28, 1936 |
| 2,105,473 | Dean | Jan. 18, 1938 |
| 2,164,171 | Vickers | July 4, 1939 |
| 2,366,382 | Burton | Jan. 2, 1945 |

FOREIGN PATENTS

| Number | Country | Date |
|---|---|---|
| 348,266 | Germany | Feb. 3, 1922 |